US011492455B1

(12) United States Patent
Charles et al.

(10) Patent No.: US 11,492,455 B1
(45) Date of Patent: Nov. 8, 2022

(54) METHOD, PROCESS AND SYSTEM FOR RECYCLING AN ASPHALT-BASED ROOFING MATERIAL

(71) Applicant: NORTHSTAR CLEAN TECHNOLOGIES INC., Delta (CA)

(72) Inventors: Terry Alan Charles, Surrey (CA); Gord Johnson, Delta (CA); Barry Diebold, Claresholm (CA)

(73) Assignee: NORTHSTAR CLEAN TECHNOLOGIES INC., Delta (CA)

( * ) Notice: Subject to any disclaimer, the term of this patent is extended or adjusted under 35 U.S.C. 154(b) by 0 days.

(21) Appl. No.: 17/681,407

(22) Filed: Feb. 25, 2022

(51) Int. Cl.
*C08J 11/08* (2006.01)

(52) U.S. Cl.
CPC ............ *C08J 11/08* (2013.01); *C08J 2395/00* (2013.01)

(58) Field of Classification Search
CPC ....................................................... C08J 11/08
USPC ......................................................... 106/278
See application file for complete search history.

(56) References Cited

U.S. PATENT DOCUMENTS

| 4,222,851 | A | 9/1980 | Good et al. |
| 4,325,641 | A | 4/1982 | Babus et al. |
| 4,706,893 | A | 11/1987 | Brock |
| 4,741,868 | A | 5/1988 | Rooney et al. |
| 5,337,965 | A * | 8/1994 | Chiovitti ................ B03B 9/065 241/DIG. 38 |
| 5,848,755 | A | 12/1998 | Zickell et al. |
| 6,221,260 | B1 | 4/2001 | Chahine et al. |
| 6,743,313 | B2 | 6/2004 | Mischo |
| 8,177,152 | B2 | 5/2012 | Harmon |
| 8,789,773 | B2 | 7/2014 | Teeter, Jr. et al. |
| 8,919,681 | B1 | 12/2014 | Horton et al. |
| 9,156,035 | B1 | 10/2015 | Horton et al. |
| 9,719,025 | B2 | 8/2017 | Gordon et al. |
| 10,323,149 | B2 | 6/2019 | Russell |
| 10,669,203 | B2 | 6/2020 | Franzen et al. |
| 2013/0313344 | A1 | 11/2013 | Nykulin et al. |
| 2014/0373749 | A1 | 12/2014 | Zickell et al. |
| 2019/0256783 | A1 | 8/2019 | Shelton, Jr. et al. |

FOREIGN PATENT DOCUMENTS

| AU | 2013204066 A1 | 2/2014 |
| CN | 205295103 U | 6/2016 |
| WO | 2020/041347 A1 | 2/2020 |
| WO | 2022/039965 A1 | 2/2022 |

* cited by examiner

*Primary Examiner* — Deve V Hall

(57) ABSTRACT

The present disclosure provides a method, process and system for recycling an asphalt-based roofing material. In particular, the method, process and system are capable of removing and recovering an aggregate product, fiber product and an asphalt product from the asphalt-based roofing material. The aggregate, fiber and asphalt products each may be reused in a variety of applications.

27 Claims, 2 Drawing Sheets

METHOD, PROCESS AND SYSTEM FOR RECYCLING AN ASPHALT-BASED ROOFING MATERIAL

TECHNICAL FIELD

The present disclosure generally relates to methods, processes and systems for the recycling of asphalt-based roofing materials. In particular, the present disclosure generally relates to methods, processes and systems to separate the constituents of an asphalt-based roofing shingle and recover and reuse such constituents in various applications.

BACKGROUND

A significant amount of unwanted material is generated from the manufacture, installation and removal of asphalt-based materials, such as roofing shingles. For example, an average residential roof removal generates 1-3 tons of roofing shingles, depending on whether the old roof consisted of 1 or 2 layers. All this adds up to an estimated total of approximately 13.5 million tons of torn-off shingles every year nationwide in North America, plus an additional 1 million tons of scrap generated by the shingle manufacturing process. This is a huge amount of unwanted material destined for already overcapacity landfills, especially since torn-off roofing shingles take at least 300 years to break down and as such some jurisdictions are increasing disposal fees, limiting disposal limits to very low percentages or banning completely. Moreover, roofing shingles cannot be composted and burning or incineration is not recommended, as it may result in the emissions of gases hazardous to human health. Since the materials in roofing shingles are similar to those materials used in hot mix asphalt cement and other road applications, unwanted roofing shingles have been identified as a material that may be diverted from landfill disposal and recycled and reused, however use in road applications is limited to very low percentages in some jurisdictions or completely banned in others.

A roofing shingle is typically made up of different materials, including cellulose (paper) or a fiberglass mat, an asphalt coating and a layer of aggregate granules dispersed on the coating. Developing technically viable and cost-effective recycling processes has proven to be challenging since these materials are difficult to break down/separate and therefore typically require complex process steps or equipment. For example, the asphalt and aggregate strongly adheres to one another making their separation difficult. A further problem associated with efforts to recycle these materials concerns the difficulty in shredding the shingles on a bulk basis. Because of their high granular material content, roofing shingles act like large pieces of sandpaper and as such, large piles of roofing shingles are extremely difficult to drag, flow, separate, or handle. Additionally, recycling of roofing shingles normally requires modification to standard grinding, screening, separation and dust control equipment in order to reach the desired end use products.

Some past recycling processes have used milling machines, such as rolling mills, bag mills, hammer mills, saw mills, etc. to produce a recycled roofing material which can only be used in road construction or as other similar "filler" material. Other processes have used a solvent to break down the roofing shingle, for example, U.S. Pat. No. 8,789,773 discloses a process, in which a solvent is first added to an asphalt-based material to form a mixture containing asphalt dissolved in solvent and a solids material. The solids material can be separated out by centrifugation or filtration while the asphalt dissolved in solvent can be fractionally distilled to separate the heavier asphalt phase from the lighter solvent phase. In WO 2020/041347, a process is disclosed that includes contacting a roofing shingle with a petroleum chemical in a screened tubular rotating apparatus to separate asphalt from the sand and fiberglass. U.S. Pat. App. Publ. No. 2019/0256783 also discloses a process whereby roofing shingles are placed in a dissolution vessel and a solvent stream is added to the vessel to dissolve the asphalt under agitation to yield a solids rich stream and a solvent and bitumen rich stream which can be passed through a flash drum to yield a solvent rich stream and a bitumen rich stream. Finally, U.S. Pat. No. 4,222,851 discloses a process in which roofing shingles are repeatedly washed with solvent and the solvent and asphalt are subsequently separated from one another in first and second stage evaporators.

Nevertheless, there is a continuing need to provide improved methods and processes in which torn-off roofing shingles and shingle material which is the by-product of the manufacture of new roofing shingles can be recycled and reused, thus avoiding landfill.

SUMMARY

According to an embodiment of the present disclosure, there is provided a method for removing aggregate from an asphalt-based roofing material by: (a) contacting the asphalt-based roofing material with at least one pressurized stream of fluid to mechanically separate the aggregate from the asphalt-based roofing material and (b) agitating or pulsing the separated aggregate, asphalt-based roofing material and fluid in a separation tank to remove the separated aggregate from the asphalt-based roofing material and fluid by density.

In some embodiments, the asphalt-based roofing material is contacted with the at least one pressurized stream of fluid within the separation tank or externally in a separate vessel.

In some embodiments, the asphalt-based roofing material is contacted with at least two pressurized streams of fluid. In some embodiments the at least two pressurized streams of fluid are opposed to one another.

In some embodiments, the fluid comprises water. In some embodiments, the fluid is at ambient temperature.

In some embodiments, the asphalt-based roofing material is pretreated to crush or grind the asphalt-based roofing material.

In some embodiments, the method further comprises the step of recovering the separated aggregate. In some embodiments, least about 90 wt. % of a total weight of aggregate originally present in the asphalt-based roofing material is recovered as separated aggregate.

According to another embodiment, there is provided a method for separating fiber from an aggregate-free asphalt-based roofing material, by: (a) mixing the aggregate-free asphalt-based roofing material with a solvent to form a slurry and (b) machine pressing or filter pressing the slurry in a fiber separator to separate fiber from the slurry and produce an asphalt/solvent mixture and a fiber product. The aggregate-free asphalt-based roofing material was obtained by contacting an asphalt-based roofing material with at least one pressurized stream of fluid to remove substantially all aggregate from the asphalt-based roofing material.

In some embodiments, the solvent is selected from an aromatic solvent, an aliphatic solvent, an alcohol, an ether, a ketone, carbon disulfide and a mixture thereof. In some embodiments, a mass fraction of solvent mixed with the aggregate-free asphalt-based roofing material is in a range of about 15-50 wt. % relative to the total weight of the slurry.

In some embodiments, the fiber separator is a rotary press, a belt press, a hydraulic press, a piston press, a hydrocyclone or a screw press.

In some embodiments, the aggregate-free asphalt-based roofing material was obtained by contacting an asphalt-based roofing material with at least one pressurized stream of fluid to remove substantially all aggregate from the asphalt-based roofing material and drying the asphalt-based roofing material.

In some embodiments, the fiber product is substantially free of asphalt.

In still another embodiment, there is provided a method for recovering an asphalt product from an asphalt/solvent mixture by: (a) passing the asphalt/solvent mixture through a solvent separator to separate the asphalt product from the solvent and (b) removing the asphalt from the solvent separator. The asphalt in the asphalt/solvent mixture was derived from an asphalt-based roofing material and is substantially free of aggregate and fiber.

In some embodiments, the solvent separator is a distillation unit or evaporator. In some embodiments, solvent separator is a wiped film evaporator. In some embodiments, the solvent comprises an aromatic solvent.

In some embodiments, step (a) is performed at a temperature between about 155° C. to about 165° C. and at atmospheric pressure.

In some embodiments, at least about 80 wt. % of a total weight of asphalt originally in the asphalt-based roofing material is recovered as the asphalt product.

In some embodiments, there is provided an asphalt product produced according to the above-described methods.

In still another embodiment, there is provided a system for producing at least an asphalt product from an asphalt-based roofing material containing a plurality of roofing shingles, the system comprising (a) an aggregate removal unit operable to remove substantially all aggregate from the asphalt-based roofing material to produce an aggregate-free asphalt/fiber mixture, (b) a fiber separation unit operable to mix the aggregate-free asphalt/fiber mixture with a solvent to produce a slurry and to remove substantially all fiber from the slurry to produce an asphalt/solvent mixture and (c) a solvent separation unit operable to separate substantially all solvent from the asphalt to produce an asphalt product.

In some embodiments, the aggregate removal unit comprises a separation tank configured to receive and combine the asphalt-based roofing material and at least one or more pressurized streams of a first fluid and to agitate or pulse a mixture of aggregate, a second fluid and the aggregate-free asphalt/fiber mixture. In some embodiments, the aggregate removal unit further comprises a dewatering or drying apparatus configured to remove moisture from the asphalt/fiber mixture.

In some embodiments, the fiber separation unit comprises a mixing tank configured to receive and combine the aggregate-free asphalt/fiber mixture and a solvent and produce an asphalt/fiber/solvent slurry. In some embodiments, the fiber separation unit further comprises a fiber separator configured to receive the asphalt/fiber/solvent slurry and separate fiber from the asphalt/fiber/solvent slurry and produce an asphalt/solvent mixture and a fiber product.

In some embodiments, the solvent separation unit comprises a solvent separator configured to receive the asphalt/solvent mixture and heat the mixture to separate the solvent from the mixture and produce the asphalt product. In some embodiments, the solvent separation unit further comprises a condenser configured to recover the solvent separated from the mixture.

In some embodiments, the system further comprises a pretreatment unit comprising a grinder operable to reduce the particle size of the asphalt-based roofing material and a feed system to deliver the asphalt-based roofing material to the aggregate removal unit.

BRIEF DESCRIPTION OF THE DRAWINGS

In drawings which illustrate embodiments of the invention.

DETAILED DESCRIPTION

Figure 1:
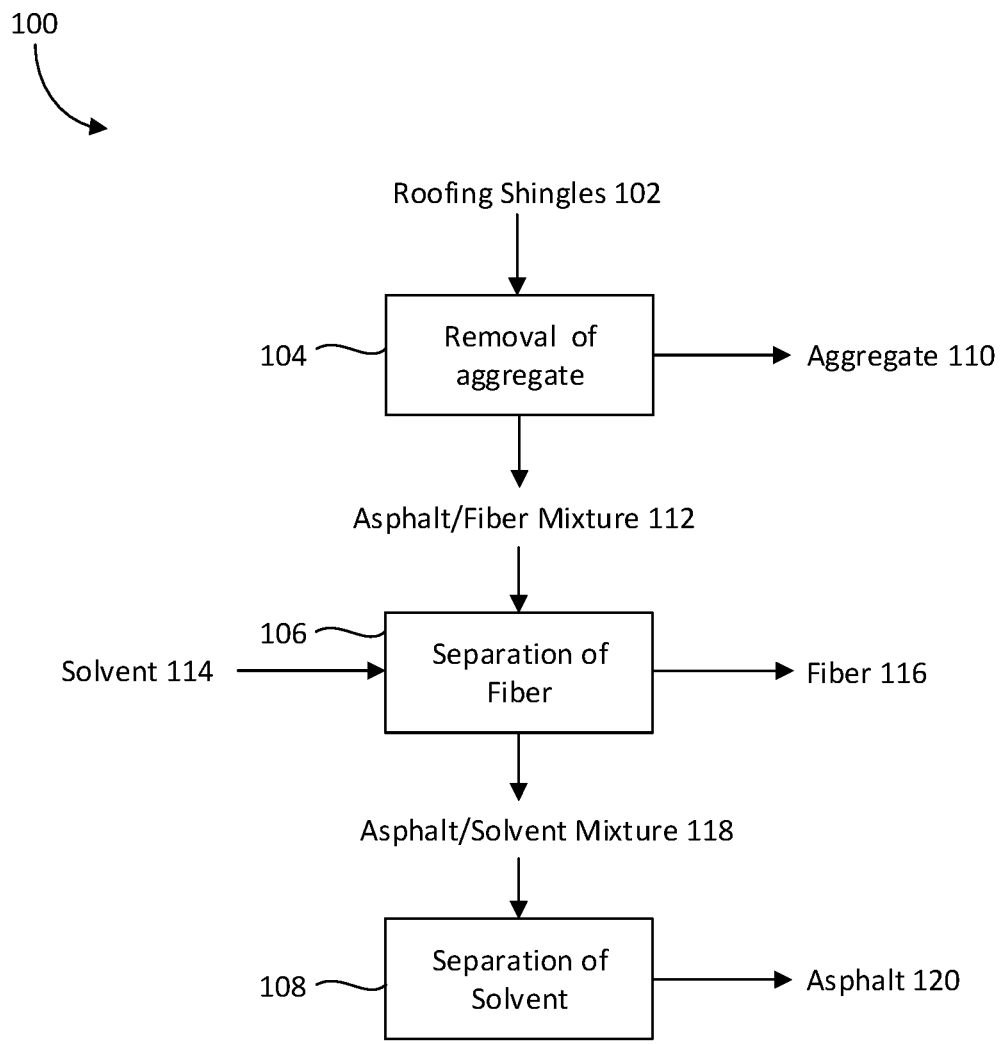
FIG. 1 is a schematic block diagram of a method for recycling an asphalt-based roofing material according to an embodiment of the present disclosure.

The following terms shall have the following meanings:

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e., to at least one) of the grammatical objects of the article. By way of example, "a solvent" means one solvent or more than one solvent. The phrases "in one embodiment", "according to one embodiment" and the like generally mean the particular feature, structure, or characteristic following the phrase is included in at least one embodiment of the present disclosure and may be included in more than one embodiment of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "optional" or "optionally" means that the subsequently described event or circumstance may or may not occur, and that the description includes instances where said event or circumstance occurs and instances where it does not.

The term "substantially free" refers to a composition in which a particular constituent or moiety is present in an amount that has no material effect on the overall composition. In some embodiments, "substantially free" may refer to a composition in which the particular constituent or moiety is present in the composition in an amount of less than about 10 wt. % or less than about 5 wt. %, or less than about 4 wt. %, or less than about 3 wt. % or less than about 2 wt. % or less than about 1 wt. %, or less than about 0.5 wt. %, or less than about 0.1 wt. %, or less than about 0.05 wt. %, or even less than about 0.01 wt. % based on the total weight of the composition, or that no amount of that particular constituent or moiety is present in the respective composition.

The term "substantially" means a proportion of at least about 60%, or preferably at least about 70% or at least about 80%, or at least about 90%, at least about 95 wt. %, at least about 97% or at least about 99% or more, or any integer between about 70% and about 100%. For example, removing substantially all of a component from a composition may be the removal of at least about 60 wt. % or at least about 70 wt. %, etc. of the component from the composition.

The term "wt. %" means weight percent.

The term "integrated process" means a process where two or more related process steps of at least two separate industrial processes, which can be separately performed, are combined, so that at least one process step is common for the two processes. Moreover, in an "integrated process" as defined herein streams, fractions and/or portions produced and/or obtained in one industrial process can be used in another industrial process thereby improving the overall process efficiently more than the sum of each individual process. The integrated process reuses certain materials and streams and reduces by-products that otherwise would require treatment. In other words, the term "integrated process" means a combination of at least two unit operations which exploits the interactions between different units in order to employ resources effectively, improve energy efficiency, improve material balance, maximize profit and/or minimize costs. At least one of the two unit operations receives material and/or energy, and may be dependent on these, from the other unit operation. In an integrated process the interactions between different unit operations are considered from the outset, rather than having them optimized separately. Process integration is not limited to the design of new plants, but it also covers retrofit design, for example new units to be installed in an old plant, and the operation of existing systems.

The term "asphalt-based roofing material" as used herein may refer to any new or used material that is used in connection with roofing and that contains a proportion of asphalt, such as for example, new or torn off (used) roofing shingles (which may be organic or fiberglass), new or used roofing felt or tar paper, flat roof material (which may include felt, aggregate and bitumen or asphalt sealant), unwanted material from the production of new roofing shingles or unwanted material from the installation of roofing shingles on residential or commercial buildings. In addition to asphalt, the asphalt-based roofing material may further include a proportion of aggregate and fiber. For example, a roofing shingle may include from about 45-55 wt. % aggregate, from about 20-30 wt. % fiber and from about 20-30 wt. % asphalt, based on the total weight of the roofing shingle.

The term "asphalt" may refer to any type of bituminous material suitable for use on a roofing material or pavement, such as asphalts, tars, pitches, or mixtures thereof. The asphalt may be either manufactured asphalt produced by refining petroleum or naturally occurring asphalt. The asphalt can be oxidized or non-oxidized. The asphalt may include any number of various additives and/or modifiers, such as inorganic fillers or mineral stabilizers, organic materials such as polymers, recycled streams, and/or ground tire rubber.

The term "aggregate" may refer to solid particles having a range of sizes including fine particles to relatively coarse particles, for example sand, crushed stone, gravel, slag, or other mineral granules.

The term "fiber" as used herein may refer to a solid fibrous material such as glass fiber or paper (cellulose) fiber. The term may refer to a mat of interwoven fiber strands when present in roofing shingles, or to a mixture of individual strands and/or particles of fiber.

The term "asphalt/fiber slurry" as used herein may refer to a mixture of asphalt, fiber (which may include fiber particles alone or partially or completely coated with asphalt), and a fluid.

The term "asphalt/fiber mixture" as used herein may refer to a mixture of asphalt and fiber derived from an asphalt-based roofing material. The asphalt/fiber mixture may include asphalt, fiber and fiber partially or completely coated with asphalt. The asphalt/fiber mixture may also contain a proportion of a fluid but which proportion is less than the proportion of fluid present in the asphalt/fiber slurry defined above.

The term "asphalt/fiber/solvent slurry" as used herein may refer to a mixture of fiber carried by a mixture of asphalt and a solvent (or a blend of more than one solvent).

The term "asphalt/solvent mixture" as used herein may refer to a mixture of asphalt and a solvent (or a blend of more than one solvent), where the asphalt may be fully or partially miscible with the solvent or dispersed within the solvent.

The present disclosure generally relates to a method and integrative process for recycling an asphalt-based roofing material and to a system for producing an asphalt product from such an asphalt-based roofing material. It has been surprisingly found that the method, process and system of the present disclosure can break down and effectively separate the constituents of the asphalt-based roofing material (such constituents having been combined together to produce the asphalt-based roofing material) using minimal equipment and without having to input large amounts of energy. Thus, the methods, integrative process and system of the present disclosure are more economical and environmentally friendlier than state of the art methods, processes and systems. Additionally, because the constituents of the asphalt-based roofing material are effectively separated from each other in high yields and purities, they can be repurposed/used in a wide range of applications. Thus, the inventive method, integrative process and system of the present disclosure avoid the need of having to sanitarily dispose a substantial amount of unwanted material generated during the shingle manufacturing process or during the shingling or re-shingling of a roof.

With reference to FIG. 1, a method 100 for recycling the asphalt-based roofing material, which according to an embodiment includes at least a plurality of roofing shingles 102, is shown and may generally include steps 104 to 108. In step 104, aggregate is removed from the asphalt-based roofing material mechanically and by density to produce an asphalt/fiber mixture 112 and an aggregate product 110. In some embodiments, the method may optionally include a step of mechanically reducing the size of the asphalt-based roofing material prior to step 104. In some embodiments, the asphalt/fiber mixture 112 that is produced in step 104 is substantially free of aggregate. In step 106, a solvent 114 is added to the asphalt/fiber mixture 112 to produce an asphalt/fiber/solvent slurry and the slurry is machine pressed to remove fiber from the slurry to produce an asphalt/solvent mixture 118 and a fiber product 116. In some embodiments, the asphalt/solvent mixture that is produced in step 106 is substantially free of fiber or aggregate or fiber and aggregate. In step 108, the solvent is separated from the asphalt/solvent mixture 118 to produce an asphalt product 120. In some embodiments, the asphalt product 120 that is produced in step 108 is substantially free of solvent or fiber or aggregate or solvent and fiber and aggregate. In further embodiments, the solvent that is separated from the asphalt/solvent mixture in step 108 may be recovered and reused in step 106.

Figure 2:
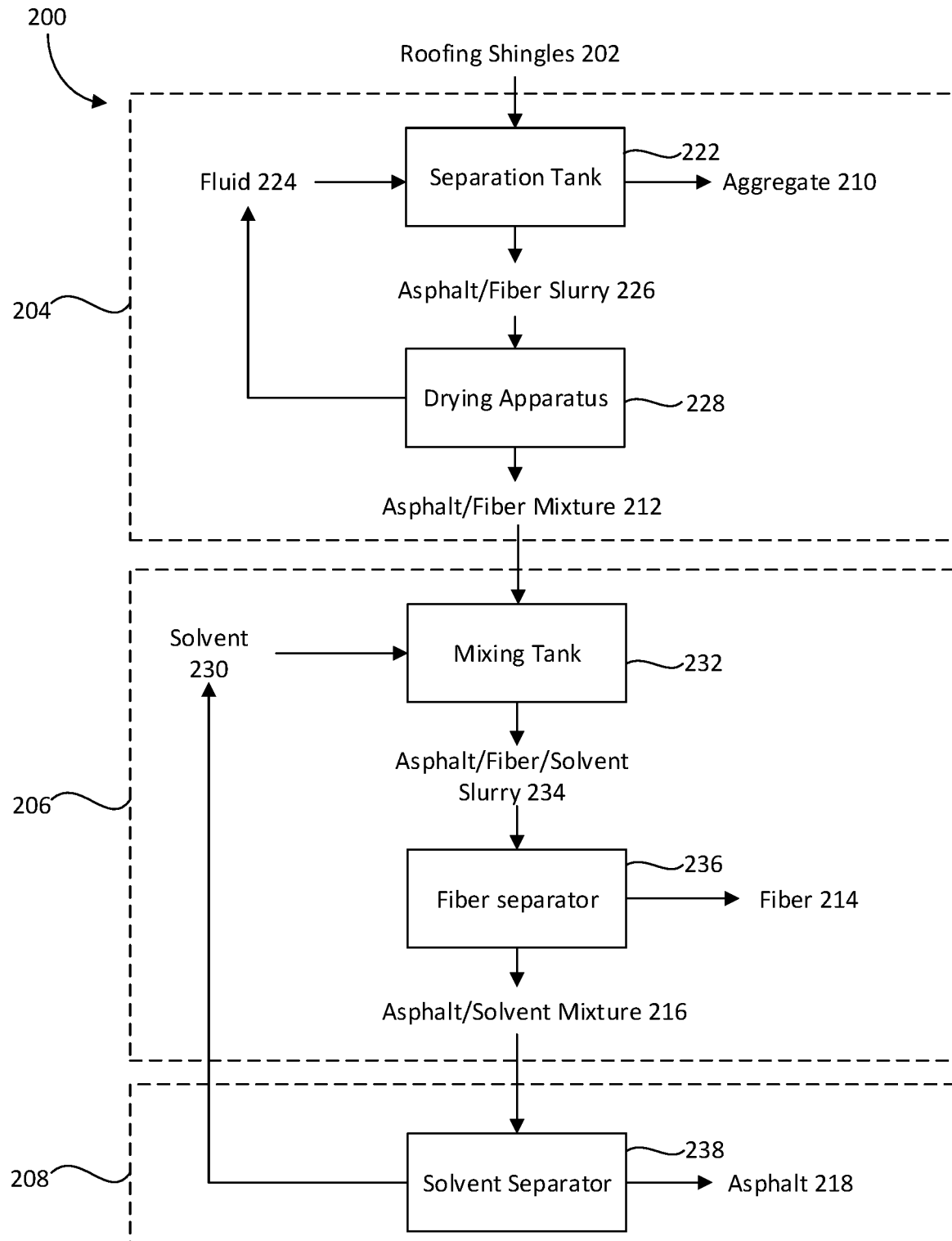
FIG. 2 schematically illustrates a system for producing an asphalt product from an asphalt-based roofing material according to another embodiment of the present disclosure.

According to another embodiment, a system 200 operable for performing the method above to produce at least an asphalt product 218 from an asphalt-based roofing material containing a plurality of roofing shingles 202, is generally shown in FIG. 2. The system 200 may be controlled by a controller (not shown) configured to control some or all of the operations described below. In particular, the controller may be configured to execute computer code for performing the operations described herein. In this regard, the controller may comprise a processor that may be a microprocessor or a controller for controlling the overall operation thereof. In one embodiment the processor may be particularly configured to execute program code instructions related to the functions described herein. The controller may also include a memory device. The memory device may include non-transitory and tangible memory that may be, for example, volatile and/or non-volatile memory. The memory device may be configured to store information, data, files, applications, instructions or the like. For example, the memory device could be configured to buffer input data for processing by the processor. Additionally or alternatively, the memory device may be configured to store instructions for execution by the processor.

The controller may also include a user interface that allows a user to interact therewith. For example, the user interface can take a variety of forms, such as a button, keypad, dial, touch screen, audio input interface, visual/image capture input interface, input in the form of sensor data, etc. Still further, the user interface may be configured to output information to the user through a display, speaker, or other output device. A communication interface may provide for transmitting and receiving data through, for example, a wired or wireless network such as a local area network (LAN), a metropolitan area network (MAN), and/or a wide area network (WAN), for example, the Internet. The communication interface may enable the controller to communicate with one or more further computing devices, either directly, or via a network. In this regard, the communication interface may include one or more interface mechanisms for enabling communication with other devices and/or networks. The communication interface may accordingly include one or more interface mechanisms, such as an antenna (or multiple antennas) and supporting hardware and/or software for enabling communications via wireless communication technology (e.g., a cellular technology, communication technology, Wi-Fi and/or other IEEE 802.11 technology, Bluetooth, Zigbee, wireless USB, NFC, RF-ID, WiMAX and/or other IEEE 802.16 technology, and/or other wireless communication technology) and/or a communication modem or other hardware/software for supporting communication via cable, digital subscriber line (DSL), USB, FireWire, Ethernet, one or more optical transmission technologies, and/or other wireline networking methods. Further, the controller may include various modules which may be configured to, in conjunction with the processor, direct operations for removing the aggregate from the roofing shingles in the aggregate removal unit, separating the fiber in the fiber separator unit and/or separating the solvent in the solvent separator unit to ultimately produce the asphalt product as described herein.

As illustrated, the system 200 may include an aggregate removal unit 204. The aggregate removal unit 204 is operable to perform step 104 above and may include a separation tank 222 configured to receive and combine the roofing shingles 202 and at least one or more pressurized streams of fluid 224. The separation tank 222 may also be configured to agitate or pulse a mixture of a fluid (which may be the same fluid as the pressurized stream of fluid or a different fluid), the roofing shingles and aggregate that may be contained therein. The aggregate removal unit 204 may further include a dewatering and/or drying apparatus 228 configured to receive the mixture contained in the separation tank 222 and to remove moisture from the mixture. Thus, as will be described in more detail below, the separation tank 222 is configured to receive and combine the roofing shingles 202 and one or more pressurized streams of fluid 224 and to agitate or pulse the mixture of fluid, roofing shingles and aggregate to produce an asphalt/fiber slurry 226 and an aggregate product 210. The dewatering and drying apparatus 228 is configured to receive the asphalt/fiber slurry 226 and remove moisture from the asphalt/fiber slurry 226 to produce an asphalt/fiber mixture 212. In some embodiments, the moisture that is removed in the dewatering and drying apparatus 228 may be recovered and reused in system 200.

The system 200 may also include a fiber separation unit 206. The fiber separation unit 206 is operable to perform step 106 above and may include a mixing tank 232 configured to receive and combine the moisture-removed mixture from the aggregate removal unit 204 and a liquid. The fiber separation unit 206 may further include a fiber separator 236 configured to receive the contents in the mixing tank 232 and separate solids from liquids. Thus, as will be described in more detail below, the mixing tank 232 is configured to receive and combine the asphalt/fiber mixture 212 and a solvent 230 to produce an asphalt/fiber/solvent slurry 234. The fiber separator 236 is configured to receive the asphalt/fiber/solvent slurry and separate fiber from the asphalt/fiber/solvent slurry 234 to produce an asphalt/solvent mixture 216 and a fiber product 214.

Finally, the system 200 may include a solvent separation unit 208. The solvent separation unit 208 may be used to perform step 108 above and may include a solvent separator 238 configured to receive a mixture of liquids and heat the mixture to separate the liquids in the mixture. Thus, as will be described in more detail below, the solvent separator 238 is configured to receive the asphalt/solvent mixture 216 and heat the mixture to separate the solvent from the mixture to produce an asphalt product 218. In some embodiments, the solvent separation unit may further include a condenser configured to condense and recover the solvent separated from the mixture so that it can be reused in the system 200.

In a further embodiment, the system 200 may optionally include a pretreatment unit (not shown). The pretreatment unit may include a grinder that is operable to crush or grind the asphalt-based roofing material as needed based on production and availability in order to reduce the roofing material to a desired particle size (for e.g., to a maximum of less than about 1 inch). In one embodiment, the particle size is screened to ¾ inch minus (i.e., ¾ of an inch or less). It should be noted that the particles are generally irregularly shaped. In some embodiments, the asphalt-based roofing material may first be cleaned of nails and other debris by hand or by using a magnet before being sent to the grinder. In other embodiments, nails and debris maybe removed after the feed hopper or after first stage of separation. The pretreatment unit may further include a feed system configured to receive the asphalt-based roofing material from the grinder and which may be interlocked with other plant components and controlled by the controller. The feed system may include a feed hopper which may be equipped with a drive motor, a strainer (e.g., comprising one or more screens), and one or more conveyors (e.g., comprising an auger). The feed system may be calibrated to regulate flow of the asphalt-based roofing material to the aggregate removal unit 204 as controlled by the controller.

Removal of Aggregate (Step 104) in the Aggregate Removal Unit (204)

As described above, in step 104 aggregate is removed from the roofing shingles 102 to produce the aggregate product 110 and the asphalt/fiber mixture 112. In the embodiment shown in FIG. 2, this removal may be accomplished in the aggregate removal unit 204 mechanically and by density by physically contacting the roofing shingles 202 with one or more pressurized streams of fluid 224 in the separation tank 222 to separate aggregate from the roofing shingles and by agitating or pulsing the mixture of fluid, roofing shingles and separated aggregate contained within the separation tank 222. In other embodiments the roofing shingles may be physically contacted with the one or more pressurized streams of fluid 224 prior to the separation tank 222.

The separation tank 222 may be shaped, sized and configured to hold any suitable volume of fluid and is also operable to agitate or pulse the fluid contained therein and therefore may include an inner cavity and a mixing device. Examples of mixing devices include, but are not limited to, vanes, paddles, blades, screw elements, or other elements of dynamic mixers such as rotating or co-rotating screw mixers, planetary and double planetary mixers, impellers, and the like or baffle elements within a static mixer, such as plates, helices, vanes, paddles, or blades, intended to disrupt laminar flow and cause mixing within the static mixer. In an embodiment, the mixing device is a is a movable paddle or block that creates an up and down or side to side movement within separation tank 222 to pulse the fluid in the separation tank 222. The separation tank 222 may be in fluid communication with one or more sources of fluids (such as a holding or buffer tank) via one or more conduits which supply the one or more pressurized streams (or jets) of fluid 224 to the separation tank 222. Each stream of fluid 224 supplied to and received by the separation tank 222 may be the same fluid or a different fluid.

The roofing shingles 202 may be introduced into some, or all, of the one or more pressurized streams of fluid 224 supplied to the separation tank 222 by any suitable method. For example, the roofing shingles 202 may be supplied to a funnel or hopper as described above that is in communication with some, or all, of the one or more streams of fluid 224. The controller may control the amount of the roofing shingles 202 which are contacted by a stream of fluid 224. Contact between the roofing shingles 202 and the streams of fluid 224 may be of sufficient force to dislodge aggregate from the roofing shingles 202 such that aggregate is separated from the roofing shingles 202. In addition, the force may be sufficient to dislodge asphalt that is adhered to and coating the aggregate such that aggregate that is separated is substantially free of adhered asphalt.

The elevated flow rate and/or pressure of the one or more streams of fluid 224 entering the separation tank 222 may be sufficient to cause cavitation of the fluid within separation tank 222. As is well known, cavitation is a phenomenon in which the local static pressure of a fluid is reduced to below the vapor pressure of the fluid causing the formation of small vapor filled cavities (or bubbles) within the fluid. Thus, one or more fluid conduits that supply the streams of fluid 224 to separation tank 222 may be configured to produce Venturi effects via a relatively narrow or constricted section within the conduit followed by a wider section that is positioned close to the outlet. As the stream of fluid 224 passes through the constricted section, the pressure of the fluid will decrease as the flow rate increases. The combination of pressure and kinetic energy can create a cavitation cavern downstream of the constriction generating high energy cavitation bubbles. These cavitation bubbles may subsequently collapse, generating shockwaves waves within the fluid. As these shockwaves contact roofing shingles 202 within separation tank 222, a cavitation force is applied to roofing shingles 202 sufficient to separate aggregate from the other constituents of the roofing shingles 202. The cavitation force may also be sufficient to dislodge asphalt adhered to and/or coating the aggregate particles such that the aggregate is substantially free of asphalt.

Further, each of the one or more fluid conduits may be positioned such that the outlet of each of the one or more conduits is generally directed towards the outlet of another of the one or more conduits. This means that one stream of fluid 224 exiting from one conduit will collide with another stream of fluid 224 exiting from another conduit within separation tank 222. This may further increase the turbulent flow of fluid 224 within separation tank 222 and may also increase contact between roofing shingles 202 and stream of fluid 224 to assist in separating aggregate from the roofing shingles 202.

In one embodiment, the separation tank 222 may have one pair of conduits, where the outlet of the first conduit may be generally directed towards the outlet of the second conduit such that the stream of fluid 224 exiting through the outlet of the first conduit will collide with the stream of fluid 224 exiting through the outlet of the second conduit.

In other embodiments, the separation tank 222 may have more than one pair of conduits where the outlet of the first conduit in each pair may be generally directed towards the outlet of the second conduit in each pair. For example, the separation tank 222 may have 2, 4, 6, 8, 10, 12 or more pairs of conduits where the outlet of the first conduit in each pair may be generally directed towards the outlet of the second conduit in each pair. Each of the pairs of conduits may be positioned at different locations in separation tank 222, for example each pair of conduits may be vertically spaced from the next pair of conduits.

In still other embodiments, in each of the pairs of conduits described above, the outlet of the first conduit may directly oppose the outlet of the second conduit in each pair. This may increase the contact between the opposing streams of fluid, increasing the number and the force of collisions between the roofing shingles 202 and streams of fluid 224.

In a further embodiment, the separation tank 222 may include more than two conduits with outlets generally directed towards each other. For example, the separation tank 222 may have three conduits, where the outlets of the first, second and third conduits are directed towards each other. In other embodiments, separation tank 222 may have 4, 5 or 6 or more conduits all having outlets directed towards each other.

In another embodiment, the separation tank 222 may have a single conduit, where the outlet of the single conduit is generally directed towards an impact surface such as a contact plate, or the inner surface of separation tank 222. The use of an impact surface other than the inner surface of separation tank 222 may be preferable to reduce wear of the inner surface of separation tank 222 caused by impact of the stream of fluid 224. The force of the stream of fluid impacting the contact plate may be of sufficient force to dislodge aggregate from the roofing shingles 202 and/or cause cavitation of the fluid within separation tank 222 as described above.

In further embodiments, the separation tank 222 may have multiple sets of single conduits where the outlets of the single conduits are generally directed towards an impact surface. For example, the separation tank 222 may have 2, 3, 4, 5, 6, 7, 8 or more sets of single conduits where the outlets of the single conduits are generally directed towards an impact surface.

In still other embodiments, for each impact surface in the separation tank 222 there may be more than one conduit where the outlet of each conduit is generally directed towards the impact surface. For example, each impact surface may have 2, 3, 4, 5, 6 or more conduits where the outlet of each conduit is generally directed towards the impact surface.

The separation tank 222 is further configured to agitate or pulse a mixture of fluid, aggregate and roofing shingles contained therein. Agitation may be achieved by any known mixing device as described above, such as for example, by rotation of a paddle or impeller configured to circulate the roofing shingles that have fallen towards the lower region of the separation tank 222 (and into the fluid contained therein) in the mixture in a generally upwards direction. By increasing the contact time of the roofing shingles 202 and fluid via agitation or pulsing, separation of aggregate from the roofing shingles 202 may be further increased in separation tank 222.

In one embodiment, the pressure of the one or more pressurized streams of fluid 224 supplied to and received by the separation tank 222 may range between about 100 psi to about 150 psi, or about 105 psi to about 145 psi, or about 110 psi to about 140 psi, or about 115 psi to about 135 psi, or about 120 psi to about 130 psi. In an embodiment, the flow rate of the one or more pressurized streams of fluid 224 supplied to and received by the separation tank 222 may range between about 50 m$^3$/hr to about 100 m$^3$/hr, or about 55 m$^3$/hr to about 95 m$^3$/hr, or about 60 m$^3$/hr to about 90 m$^3$/hr, or about 65 m$^3$/hr to about 85 m$^3$/hr, or about 70 m$^3$/hr to about 80 m$^3$/hr.

In another embodiment, the separation tank 222 may be generally cylindrical and orientated vertically. In a specific embodiment, the separation tank 222 may have an internal volume of about 10 m$^3$ to about 100 m$^3$, or about 20 m$^3$ to about 90 m$^3$, or about 30 m$^3$ to about 70 m$^3$, or about 40 m$^3$ to about 60 m$^3$.

The fluid supplied to and received by the separation tank 222 as described above may be selected from a fluid or blend of fluids having a lower specific gravity than the specific gravity of aggregate, such that, once the aggregate has been separated from roofing shingles 202, it will migrate towards the lower end or bottom of separation tank 222. An aggregate product 210 may then be removed from such lower end or bottom of the separation tank 222 and further processed or repurposed as will be further described below. The fluid or blend of fluids may also have a specific gravity that is greater than the specific gravity of the remaining constituents of roofing shingles 202, namely a mixture of asphalt and fiber, so that this mixture will migrate to the upper end of separation tank 222 for removal as an asphalt/fiber slurry 226.

Furthermore, in some embodiments, the fluid or blend of fluids described above may also be immiscible with asphalt so that the asphalt present in the roofing shingles 202 is not lost through dissolution into the fluid or blend of fluids. For example, in one embodiment such fluid may include a glycol, such as ethylene glycol and propylene glycol. In another embodiment, the fluid may include an alcohol, such as a straight or branched chain $C_1$-$C_{10}$ alcohol or mixture thereof. In another embodiment the $C_1$-$C_{10}$ alcohol is ethanol, n-propanol, isopropanol (IPA), n-butanol, propanol, or t-butanol. In yet another embodiment the fluid may comprise dimethylformamide (DMF), acetonitrile, acetone, tetrahydrofuran dimethylsulfoxide (DMSO), methylethylketone (MEK), or an aromatic solvent such as benzene, methylbenzene (toluene), dimethylbenzene or ethylbenzene.

In one specific embodiment, the fluid supplied to and received by the separation tank 222 via the one or more conduits comprises water. A pressurized stream of water may enter the separation tank 222 through the one or more conduits at a pressure ranging between about 100 psi to about 150 psi or about 105 psi to about 145 psi, or about 110 psi to about 140 psi, or about 115 psi to about 135 psi, or about 120 psi to about 130 psi. In an embodiment, the flow rate of the stream of water may range between about 50 m$^3$/hr to about 130 m$^3$/hr, or about 55 m$^3$/hr to about 125 m$^3$/hr, or about 60 m$^3$/hr to about 120 m$^3$/hr, or about 65 m$^3$/hr to about 115 m$^3$/hr, or about 70 m$^3$/hr to about 110 m$^3$/hr or about 75 m$^3$/hr to about 105 m$^3$/hr or about 80 m$^3$/hr to about 100 m$^3$/hr or about 85 m$^3$/hr to about 95 m$^3$/hr. The pressure and flow rate may be selected so they are sufficient to cause cavitation in the separation tank 222.

In an embodiment, the fluid contained within the separation tank 222 and/or the one or more streams of fluid 224 contacting the roofing shingles 202 are at ambient temperature. Aside from the lower energy input required, performing step 104 at ambient temperatures may advantageously assist in the separation of aggregate from the roofing shingles 202 since at lower temperatures, the roofing shingles 202 tend to be more brittle (and less ductile) allowing the aggregate to separate from the roofing shingles 202 more easily.

In a further embodiment, the fluid contained in the separation tank 222 and/or the one or more streams of fluid 224 contacting the roofing shingles 202 may be at an elevated temperature, i.e. a temperature that is greater than ambient temperature. The elevated temperature may be attained by any suitable method known in the art. For example, the separation tank 222 and or one or more conduits may include heating coils or heat traces. Alternatively, the streams of fluid 224 supplied to the separation tank 122 through the one or more conduits may be preheated to an elevated temperature relative to the fluid contained in separation tank 222.

As described above, aggregate separated from the roofing shingles 202 may migrate towards the lower end or bottom of the separation tank 222 during agitation. The lower end of the separation tank 222 may have a tapered frustoconical shape such that separated aggregate is channeled towards the lower end of the separation tank 222 and recovered from the separation tank 222 as an aggregate product 210. The aggregate product 210 that is recovered may be dewatered and/or dried using any suitable means known to those skilled in the art, such as by passing the aggregate product 210 over a vibrating screen/shaker deck or by air drying. In some embodiments, moisture that is removed during drying may be collected, filtered or desilted in one or more purification steps and then recycled back to the separation tank 222.

The separation of aggregate from the roofing shingles 202 during step 104 may be highly efficient such that substantially all of the aggregate originally present in the roofing shingles 202 is recovered from separation tank 222 as the aggregate product 210 and therefore the roofing shingles 202 remaining in separation tank 222 are substantially free of aggregate, i.e., aggregate-free asphalt-based roofing shingles. According to one embodiment, at least about 90 wt. % of the total weight of aggregate originally present in the roofing shingles 202 is recovered as aggregate product 210. In other embodiments at least about 91 wt. %, or at least about 92 wt. %, or at least about 93 wt. %, or at least about 94 wt. %, or at least about 95 wt. %, or at least about 96 wt. %, or at least about 97 wt. %, or at least about 98 wt. %, or at least about 99 wt. % of the total weight of aggregate originally present in roofing shingles 202 is recovered as aggregate product 210.

As described above, the asphalt/fiber slurry 226 may be removed from the upper end of the separation tank 222. The upper end of the separation tank 222 may have a tapered frustoconical shape such that the asphalt/fiber slurry 226 is channeled towards the central upper end of the separation tank 222 for easier removal.

The recovery of asphalt and fiber in the asphalt/fiber slurry 226 from the separation tank 222 may be highly efficient such that the wt. ratio of asphalt to fiber in the asphalt/fiber slurry 226 is similar to the wt. ratio in the roofing shingles 202, i.e., about a 1:1 wt. ratio of asphalt to fiber. The asphalt/fiber slurry 226 also includes a proportion of fluid. According to an embodiment in which the fluid is water, the asphalt/fiber slurry 226 can contain at least about 80 wt. % water, based on the total weight of the asphalt/fiber slurry for example, at least about 81 wt. % water, at least about 82 wt. % water, at least about 83 wt. % water, at least about 84 wt. % water, at least about 85 wt. % water, at least about 86 wt. % water, at least about 87 wt. % water, at least about 88 wt. % water, at least about 89 wt. % water, at least about 90 wt. % water, at least about 91 wt. % water, at least about 92 wt. % water, at least about 93 wt. % water, at least about 94 wt. % water, at least about 95 wt. % water, based on the total weight of the asphalt/fiber slurry.

In another embodiment not shown in FIG. 2, the removal of aggregate from roofing shingles 202 and the separation of aggregate and asphalt/slurry 226 may occur in separate locations. For example, roofing shingles 202 may first enter a first tank where contact with one or more streams of fluid 224 occurs in order to separate aggregate in a similar manner as described above. In this embodiment, separation of aggregate from asphalt/fiber slurry 226 does not occur in the same tank where cavitation occurs. Instead, a mixture of aggregate, asphalt/fiber slurry 126 and fluid may feed into a separation apparatus in fluid communication with the first tank, where separation of aggregate product 210 from asphalt/fiber slurry 226 occurs. The separation apparatus may be any suitable apparatus operable to separate aggregate from asphalt/fiber slurry 226 such as a separation tank, a vertical or horizontal classification tank or a jig concentrator.

In an embodiment, the separation apparatus may be a jig such as a water or an air pulsed jig. A water jig may include an inclined jig bed (such as a screen or sieve) within a tank of fluid, such as fluid 224. A stream of aggregate and asphalt fiber slurry 226 may be fed on top of the jig bed at the higher end of the inclined jig bed. The fluid within the tank may be pulsed such that a column of fluid rises up through the jig bed, suspending the particles (e.g. the aggregate and asphalt/fiber particles) within the column of fluid. When the fluid level drops back down, the particles will be redeposited onto the jig bed. As the pulsing of the fluid is repeated, those particles with a higher specific gravity (i.e., aggregate) will redeposit faster than those particles with a lower specific gravity (i.e., asphalt/fiber). As such, the aggregate and asphalt/fiber will be separated by density and can be extracted from lower end of jig bed separately.

Referring to FIG. 2 the asphalt/fiber slurry 226 that is recovered from the separation tank 222 is sent to and received by a dewatering or drying apparatus 228 where fluid is removed from the asphalt/fiber slurry 226 to produce the asphalt/fiber mixture 212. Such removal can not only increase process efficiency but can also reduce sludge and/or emulsion formation from possibly occurring in subsequent steps 106 and 108 of method 100.

The dewatering or drying apparatus 228 may be any suitable type of dryer equipment operable for removing a proportion of fluid from the asphalt/fiber slurry 126. For example, the drying apparatus 228 may be a vacuum dryer, tray dryer, fluidized bed dryer, rotary dryer, dewatering screen or spray dryer. In another embodiment, the drying apparatus 228 is a centrifuge, for example a decanter centrifuge. The use of a decanter centrifuge may be preferred since it is able to operate at a high throughput while at ambient temperature. In still another embodiment, the drying apparatus 228 may be a hydrocyclone. The asphalt/fiber slurry 226 may first enter the hydrocyclone where a first proportion of the fluid from the asphalt/fiber slurry 226 is removed, for example from about 70-95 wt. % of the total weight of fluid present in asphalt/fiber slurry 226 is removed. The drying apparatus 228 may further include a secondary drying apparatus, such as a fluidized bed dryer located downstream of the hydrocyclone, where a second proportion of fluid is removed from the asphalt/fiber slurry.

In some embodiments, the fluid that is removed from the asphalt/fiber slurry 226 by the drying apparatus 228 may be recovered and recycled back to the separation tank 228. When the fluid that is removed is water, such water may be treated to remove impurities before being recycled back to the separation tank 222. For example, suspended solids in the water may be removed using a de-silter prior to being recycled back to the separation tank 222.

The dewatering or drying apparatus 228 may be configured and operable to remove only fluid from the asphalt/fiber slurry 226 and thus, substantially all of the asphalt and fiber in the asphalt/fiber slurry 226 may be recovered as asphalt and fiber in the asphalt/fiber mixture 212. In an embodiment, more than 80 wt. % of the total weight of asphalt and fiber in the asphalt/fibre slurry 226 is recovered as asphalt and fiber in the asphalt/fiber mixture 212, or more than 85% wt. %, or more than 90% wt. %, or more than 95% wt. %, or more than 98% wt. % of the total weight of asphalt and fiber in asphalt/fibre slurry 226 is recovered as asphalt and fiber in the asphalt/fiber mixture 212.

Generally speaking, the asphalt/fiber mixture 212 will have a fluid content that is less than the fluid content of the asphalt/fiber slurry 226. According to one embodiment, when the fluid is water, the asphalt/fiber mixture 112 can contain less than about 1 wt. % water, based on the total weight of the asphalt/fiber mixture, for example, less than about 2 wt. % water, or less than about 4 wt. % water, or less than about 6 wt. % water, or less than about 8 wt. % water, or less than about 10 wt. % water, or less than about 12 wt. % water, or less than about 14 wt. % water, or less than about 15 wt. % water, based on the total weight of the asphalt/fiber mixture.

As described above, substantially all of the aggregate may be separated from the roofing shingles 202, such that the asphalt/fiber mixture 212 is substantially free of aggregate. In one embodiment, the asphalt/fiber mixture may contain less than about 5 wt. % of aggregate, based on the total weight of the asphalt/fiber mixture. In other embodiments, the asphalt/fiber mixture may contain less than about 4 wt. %, or less than about 3 wt. %, or less than about 2 wt. %, or less than about 1 wt. %, based on the total weight of the asphalt fiber mixture. Accordingly, the aggregate removal unit 204 may be operable to remove at least 95 wt. % of the total weight of aggregate in the roofing shingles 202. In other embodiments, the aggregate removal unit 204 may be operable to remove at least about 96 wt. %, or at least about 97 wt. % or at least 98 wt. % or at least 99 wt. % of the total weight of aggregate in the roofing shingles 202.

Separation of Fiber Step (106) in Fiber Separation Unit (206)

As described above, in step 106, fiber may be separated from the asphalt/fiber mixture 112 by adding a solvent 114 to the asphalt/fiber mixture 112 to form the asphalt/fiber/solvent slurry 134 and machine pressing the slurry to remove fiber from the slurry to produce an asphalt/solvent mixture 118 and a fiber product 116. In the embodiment shown in FIG. 2, this separation may be accomplished in the fiber separation unit 236 by adding solvent 230 to the asphalt/fiber mixture 212 in mixing tank 232 to form an asphalt/fiber/solvent slurry 234 and separating fiber from the asphalt/fiber/solvent slurry 234 in the fiber separator 236 to produce an asphalt/solvent mixture 216 and fiber product 214. In one embodiment, step 106 is performed in the fiber separation unit 206 at ambient temperature.

The mixing tank 232 may be any suitable container or vessel configured to receive and mix the solvent 230 and asphalt/fiber mixture 212 to form the asphalt/fiber/solvent slurry 216 and holding the slurry therein. The mixing tank 232 may include any mixing device suitable for mixing described above, such as a paddle, impeller or a recirculation pump to improve the contact between the solvent 230 and asphalt/fiber mixture 212.

The solvent 230 may be any suitable solvent or blend of more than one solvent. In one embodiment, the solvent 230 may be at least one solvent that is miscible with asphalt. The solvent 230 may perform some or all of the beneficial functions as outlined below when introduced into the mixing tank 232. Firstly, the solvent 230 may act as a release agent to strip or remove asphalt coating the fiber in the asphalt/fiber mixture 212 (i.e. the fiber in the asphalt/fiber/solvent slurry 134 may become substantially free from adhered asphalt). The solvent 230 may also act as a co-solvent/diluent for the asphalt/fiber mixture 212 which will beneficially reduce the viscosity of the asphalt/fiber/solvent slurry 234. As such, the asphalt/fiber/solvent slurry 234 may include a liquid phase that is a solution of solvent and asphalt with a solid phase of fiber. Furthermore, the solvent 230 may be selected from a group of solvents having a boiling point that enables easier solvent separation in step 108.

In one embodiment, the solvent 230 may comprise an aromatic solvent, which refers to a solvent comprising at least one aryl group. The term "aryl" as used herein, whether it is used alone or a part of another group refers to cyclic groups that contain at least one aromatic ring. In an embodiment, the aromatic solvent is benzene, toluene, ortho-xylene, meta-xylene, para-xylene, ethylbenzene or trimethylbenzene.

In another embodiment, the solvent 230 comprises an aliphatic solvent or blend of more than one aliphatic solvent such as a straight or branched chain $C_4$-$C_{30}$ alkane or $C_4$-$C_{40}$ olefin. In one embodiment, the aliphatic solvent, is butane, pentane, cyclopentane, hexane, cylcohexane, heptane, octane, nonane, decane, undecane or dodecane, or a terpene such as limonene. In other embodiments the aliphatic solvent may be any suitable blend of more than one aliphatic solvents such as gasoline, diesel, petroleum distillate, petroleum ether, mineral spirits, naptha, kerosene or turpentine.

In another embodiment, the solvent 230 comprises a halogenated solvent, that is a solvent containing at least one halogen atom, such as dichloromethane, 1,1,1-trichloroethylene, tetrachloroethylene, n-propylbromide, chlorohexane, carbon tetrachloride or chloroform.

In another embodiment, the solvent 230 comprises a suitable alcohol, such as a straight or branched chain $C_1$-$C_{10}$ alcohol or mixture thereof. In an embodiment the $C_1$-$C_{10}$ alcohol is ethanol, butanol, propanol, isopropanol (IPA). The alcohol may comprise an aromatic alcohol, which refers to an alcohol comprising an aryl group as defined above, such as benzyl alcohol.

In an embodiment, the solvent 230 comprises an ether, such as tetrahydrofuran, diethyl ether, 1,2-dioxane, 1,3-dioxane or 1,4-dioxane, methoxybenzene.

In another embodiment, the solvent 230 comprises a ketone, for example a $C_3$-$C_{12}$ ketone such as acetone, methyl ethyl ketone (MEK), methyl isobutyl ketone, or methyl acetate.

In another embodiment, the solvent 230 is carbon disulfide.

The solvent 230 may be added to the mixing tank 232 in any suitable mass fraction relative to the asphalt/fiber mixture 212. For example, the mass fraction of solvent 230 that is added to the asphalt/fiber mixture 212 may be selected such that substantially all of the asphalt in the asphalt/fiber mixture 212 coating the fiber is released so substantially all of the asphalt in the asphalt/fiber/solvent slurry 234 is in the liquid phase. Further, the solvent 230 may be added such that the asphalt/fiber/solvent slurry 234 is flowable at ambient temperature.

In one embodiment, the mass fraction of solvent 230 added to the asphalt/fiber mixture may be in the range of about 15-50 wt. % relative to the total weight of the asphalt/fiber mixture 212. In another embodiment, the amount of the solvent 230 added to the asphalt fiber mixture is an amount of greater than about 15 wt. % relative to total weight of the asphalt/fiber mixture 212, for example, greater than about 20 wt. %, greater than about 25 wt. %, greater than about 26 wt. %, greater than about 27 wt. %, greater than about 28 wt. %, greater than about 29 wt. %, greater than about 30 wt. %, greater than about 31 wt. %, greater than about 32 wt. %, greater than about 33% water, greater than about 34 wt. % water, greater than about 35 wt. % water, greater than about 40 wt. % water, greater than about 45 wt. % water, or greater than about 50 wt. %, relative to the total weight of the asphalt/fiber mixture 212.

The asphalt/fiber/solvent slurry 234 is then sent to and received by the fiber separator 236 to separate the fiber from the slurry. The fiber separator 236 may be any suitable piece of equipment or apparatus that is operable to separate fiber from the asphalt/fiber/solvent slurry 234, such as a machine press (mechanical press) or a filter press. For example, the fiber separator 236 may be a rotary press, belt press, hydraulic press, piston press, hydrocyclone or a centrifuge.

In one embodiment, the fiber separator 236 is a screw press, also commonly referred to as a dewatering screw press, which is operable to separate fiber from the asphalt/fiber/solvent slurry 234. The screw press is known and may include one or more screws (also known as an Archimedean screw) which is rotatable within a housing. The screw may include a central shaft about which is wound a spiral steel plate. Material, in this case the asphalt/fiber/solvent slurry 234, may be sent to and received by an inlet of the screw press. As the screw rotates, for example when driven by an electrical motor, the slurry 234 within the housing will move towards the opposite end of the inlet (i.e., discharge end) of the housing. As the slurry 234 moves from the inlet end to the discharge end, the cavity size in which the slurry 234 is contained decreases such that the slurry therein is compressed. This reduction in cavity size may be due to a taper on the central shaft of the screw such that the diameter of the shaft increases towards the discharge end. Additionally or alternately, the separation between the flights of the spiral steel plate may decrease towards the discharge end of the screw press in order to compress the slurry 234 between the flights towards the discharge end.

The housing may be made from a permeable material, such as a screened surface, a perforated sheet, a sintered screen or a wedge wire screen that, as the slurry 234 is compressed therein, the internal pressure generated within the housing forces asphalt and solvent to be discharged through the permeable material. The permeable material may be selected such that substantially only asphalt and solvent will pass through the permeable material and not fiber or other solid particles from the asphalt/fiber/solvent slurry 234. In this example, the liquid (or filtrate or liquor) passing through the permeable material is the asphalt/solvent mixture 216.

The remaining solid fiber material, which does not pass through the cylindrical housing is conveyed towards the discharge end of the screw press by the rotational action of the screw and may be recovered at the discharge end as the fiber product 214 commonly called the press cake or filter cake.

In comparison to other fiber separators, a screw press is well suited to process relatively viscous materials, such as the asphalt/fiber/solvent slurry 234. A screw press may also advantageously operate in continuous manner with a high throughput and is less susceptible to clogging/blockages in comparison to other fiber separators.

In some embodiments, either or both of the screw press or the asphalt/fiber/solvent slurry 234 may be at ambient temperature or at an elevated temperature.

In and embodiment the screw press may be a twin screw press, which includes two opposed, intermeshing screws configured to rotate in opposite directions relative to each other.

The fiber product 214 that is separated from the slurry 234 and recovered from the fiber separator 236 may be substantially free of asphalt. In one embodiment, the fiber product 214 may have less than about 20 wt. % of asphalt, based on the total weight of the fiber product 214. In other embodiments, the fiber product 214 may have less than about 15 wt. %, or less than about 10 wt. % or less than about 9 wt. % or less than about 8 wt. % or less than about 7 wt. % or less than about 6 wt. % or less than about 5 wt. % or less than about 4 wt. % or less than about 3 wt. % or less than about 2 wt. % or less than about 1 wt. % of asphalt, based on the total weight of the asphalt product 214.

Recovery of Asphalt Step (108) in Solvent Separation Unit (208)

As described above, in step 108 solvent may be separated from the asphalt/solvent mixture 116 by heating the mixture to separate the solvent from the mixture to produce an asphalt product 118. In the embodiment shown in FIG. 2, this separation may be accomplished in the solvent separation unit 208 by passing the asphalt/solvent mixture 216 through the solvent separator 238 to produce the asphalt product 218.

In one embodiment, the solvent separator 238 may be any suitable distillation unit or evaporator such as, for example a fractional distillation unit, a short path distillation unit, a 2-stage distillation unit, a disc and donut distillation unit or a spinning band distillation unit operable to separate solvent from the asphalt/solvent mixture 216. The solvent separator 238 may operate at atmospheric or reduced pressure as required. In another embodiment, the solvent separator 238 may be an evaporator, such as thin film evaporator, which may include a falling film evaporator or a wiped film evaporator. In another embodiment, the solvent separator 238 may be a heated stirred tank such as a commonly known continuous stirred tank reactor (CSTR).

In other embodiments, the solvent separator operates at atmospheric pressure and at a temperature of about 75° C. or greater. In one embodiment, the solvent separator operates at atmospheric pressure and a temperature of about 77° C.

In one preferred embodiment, the solvent separator 238 is a wiped film evaporator (WFE), also known as a wiped film distillation unit. The WFE may include a vertically orientated cylinder with an internal rotor driven wiper. The wiper may include a single blade or a plurality of stacked blades that may be offset and/or overlap with respect to each other. In an embodiment the WFE may have 32 blades. The cylinder may be externally heated, such as by a surrounding heated jacket. The asphalt/solvent mixture 216 may be introduced at the upper end of the cylinder and the wiper may distribute the mixture to create a thin film of the mixture on the inner surface of the cylinder. As the mixture 216 spirals down the inner surface of the cylinder, the solvent within the mixture is readily evaporated.

The distillate vapor (i.e., solvent) may be condensed and collected in an internal condenser running down the center of the cylinder. In other embodiments, the distillate vapor may flow out of either the top or bottom of the WFE and may be condensed in an external condenser.

The concentrate (i.e., asphalt 118) does not evaporate under these conditions and will run down the inner surface of the cylinder and be recovered as the asphalt product 218 at the lower end of the cylinder where it may be transferred, for e.g., to a storage tank or rail car or road tanker, for further processing/repurposing.

The WFE may operate at about 10° C. to about 50° C. above the boiling point of the solvent being used and at about 10° C. to about −50° C. below the lowest boiling point component of the asphalt. The WFE may operate under a vacuum which may be least about 0 mmHg up to a slight positive pressure of about 30 psia (i.e., from about 0 atm to about 2 atm). In one example embodiment, when the solvent 230 is toluene, the WFE may operate at a temperature of about 155-165° C. and at atmospheric pressure.

In an embodiment, the WFE operates at a temperature between about 120° C. and about 200° C. and at atmospheric pressure.

The solvent that is condensed and recovered from the solvent separator 236 may be substantially free of asphalt and other impurities and may be recycled back to mixing tank 232, as shown in FIG. 2.

The asphalt product 218 may be recovered from the solvent separator 238 in high yield and purity and may be substantially free of fiber, solvent and fluid 224. According to one embodiment, the asphalt product 218 can contain less than about 1 wt. % of fiber and/or solvent and/or fluid 224, based on the total weight of the asphalt product, for example less than about 2 wt. %, less than about 3 wt. %, less than about 4 wt. % or less than about less than about 5 wt. %, based on the total weight of the asphalt product.

In an embodiment where asphalt/solvent mixture 216 contains a proportion of water and where solvent 230 is toluene, the toluene and water within asphalt/solvent mixture 261 may form an azeotropic mixture. As is known, an azeotropic mixture may have a boiling point that is lower than either of its constituents. As such, depending on the composition of the azeotropic mixture the solvent separator 238 (such as a WFE) may operate at a lower temperature.

The overall recovery of the asphalt product 218 from the roofing shingles 202 may be highly efficient such that a large proportion of the asphalt that was present in the roofing shingles 202 when the roofing shingles are added to the separation tank 222 is recovered as asphalt product 218. According to one embodiment, at least about 80 wt. % of the total weight of asphalt in the roofing shingles 202 is recovered as asphalt product 218, for example at least about 82 wt. %, at least about 84 wt. %, at least about 86 wt. %, at least about 88 wt. %, at least about 90 wt. %, at least about 92 wt. %, at least about 94 wt. %, at least about 96 wt. %, at least about 98 wt. % at least about 98 wt. % of the total weight of asphalt in the roofing shingles 202 is recovered as asphalt product 218.

In another embodiment, the present disclosure provides a process for recycling asphalt-based roofing materials wherein the units of such a process are completely integrated, and thus the process is of low cost, economical and versatile due to the alternatives and interconnections within their steps. The integrated process is more energy efficient and materials efficient than the individual processes together, and, as such, yields a higher productivity.

According to one embodiment, the integrated process of the present disclosure relates to an integrated process for recycling asphalt-based roofing shingles to produce an aggregate product, a fiber product and an asphalt product. The integrated process may include a step of contacting the asphalt-based roofing shingles with at least one pressurized stream of fluid in a separation tank to separate aggregate from the roofing shingles to produce an asphalt/fiber slurry and the aggregate product as described above. Moisture is then removed from the asphalt/fiber slurry in a dewatering or drying apparatus to produce an asphalt/fiber mixture. The moisture that is removed in the drying apparatus may be recovered and recycled back to the separation tank.

The integrated process also includes a step of adding a solvent to the asphalt/fiber mixture produced above in a mixing tank to produce an asphalt/fiber/solvent slurry. Fiber is separated from the asphalt/fiber/solvent slurry in a fiber separator to produce an asphalt/solvent mixture and the fiber product.

The integrated process also includes a step of separating solvent from the asphalt/solvent mixture produced above in a solvent separator to produce the asphalt product. Solvent separated from the asphalt/solvent mixture may be recovered and recycled back to the mixing tank.

The integrated process described above may run batchwise or continuously where roofing shingles are continuously added to the process while the aggregate, fiber and asphalt products are continuously produced and collected. The fluid and solvent that are recovered may be continuously reused within the integrated process as described above such that additional fluid and solvent may not need to be required to be added during continuous operation. In some embodiments a small amount of fluid and/or solvent may need to be added to account for any losses during the process.

Accordingly, the products made in the method, integrated process and system described herein may be suitable for a use in variety of applications. By way of example, the aggregate product may be used in asphalt concrete for paving and road surfaces, in the manufacture of new asphalt-based roofing materials, as a blasting material (or media) in sandblasting and in other general construction materials.

When the roofing shingles include paper fiber, the fiber product may have a high BTU value and may be suitable for use as an engineered fuel. The fiber product may beneficially contain a trace amounts of combustible organics, such as solvent and/or asphalt which may increase the BTU value of the fiber product. In one embodiment, the fiber product may be used as an engineered fuel, such as for a cement production facility.

When the roofing shingles include glass fiber, the fiber product may be incorporated into the production of new glass fiber materials and products. In another embodiment, the fiber product may be used in patching kits for repairing fiber glass structures, such as boats and kayaks. In one embodiment, the fiber product may be further processed by mechanical grinding or milling to reduce its particle size to a fine powder that may be incorporated as a filler or reinforcing material for products such as artificial wood, cement or asphalt concrete.

The asphalt product produced herein may be of a similar quality to refined (or virgin) asphalt and may be suitable for any application where refined asphalt is used. For example, the asphalt may be suitable for blending with virgin asphalt for any application where refined asphalt is used. For example, the asphalt product may be used in asphalt concrete for paving and road surfaces, in the manufacture of new asphalt-based roofing materials and sealing and insulating a variety of building materials, such as pipe coatings and carpet tile backing.

In an embodiment, the asphalt produced herein may have a penetration grade of between about 8 and about 50 decimillimeters (dmm), as measured by the American Society for Testing and Materials (ASTM) D5-06 standard test method.

In an embodiment, the asphalt produced herein may have a softening point of between about 80° C. and about 120° C. or greater as measured by the ASTM D36-95 standard test method.

In an embodiment, the asphalt produced herein may have a flash point of between about 180° C. and about 300° C. or greater as measured by the ASTM D92-05a standard test method.

In other embodiments, any of the intermediate products disclosed herein, such as the asphalt/fiber slurry, the asphalt/fiber mixture, the asphalt/fiber/solvent slurry and the asphalt/solvent mixture, may be collected and transported to another location for further processing, which may include the steps described above or different method steps to produce any of the product described above.

For example, in one embodiment, the asphalt/solvent mixture, rather than entering the solvent separator, may be transported, such as by tanker truck, rail or pipeline for further use, storage or processing. The presence of the solvent in the mixture may beneficially act as a diluent to lower the viscosity of the asphalt/solvent mixture simplifying the handing and transport of the mixture, especially while at lower temperatures. In one embodiment, the asphalt/solvent mixture may be transported to another facility where the solvent may be separated from the mixture by a solvent separator described above to produce an asphalt product.

Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the invention, and do not delimit the scope of the invention.

What is claimed is:

1. A method for removing aggregate from an asphalt-based roofing material comprising:
   (a) contacting the asphalt-based roofing material with at least one pressurized stream of fluid to mechanically separate the aggregate from the asphalt-based roofing material; and
   (b) agitating or pulsing the separated aggregate, asphalt-based roofing material and fluid in a separation tank to remove the separated aggregate from the asphalt-based roofing material and fluid by density.

2. The method of claim 1, wherein the asphalt-based roofing material is contacted with the at least one pressurized stream of fluid within the separation tank or externally in a separate vessel.

3. The method of claim 1, wherein the asphalt-based roofing material is contacted with at least two pressurized streams of fluid.

4. The method of claim 3, wherein the at least two pressurized streams of fluid are opposed to one another.

5. The method of claim 1, wherein the fluid comprises water.

6. The method of claim 5, wherein the fluid is at ambient temperature.

7. The method of claim 1, wherein the asphalt-based roofing material is pretreated to crush or grind the asphalt-based roofing material.

8. The method of claim 1, further comprising the step of recovering the separated aggregate.

9. The method of claim 8, wherein at least about 90 wt. % of a total weight of aggregate originally present in the asphalt-based roofing material is recovered as separated aggregate.

10. A method for separating fiber from an aggregate-free asphalt-based roofing material, the method comprising:
    (a) mixing the aggregate-free asphalt-based roofing material with a solvent to form a slurry; and
    (b) machine pressing or filter pressing the slurry in a fiber separator to separate fiber from the slurry and produce an asphalt/solvent mixture and a fiber product,
    wherein the aggregate-free asphalt-based roofing material was obtained by contacting an asphalt-based roofing material with at least one pressurized stream of fluid to remove substantially all aggregate from the asphalt-based roofing material.

11. The method of claim 10, wherein the solvent is selected from an aromatic solvent, an aliphatic solvent, an alcohol, an ether, a ketone, carbon disulfide and a mixture thereof.

12. The method of claim 11, wherein a mass fraction of solvent mixed with the aggregate-free asphalt-based roofing material is in a range of about 15-50 wt. % relative to the total weight of the slurry.

13. The method of claim 10, wherein the fiber separator is a rotary press, a belt press, a hydraulic press, a piston press, a hydrocyclone or a screw press.

14. The method of claim 10, wherein the aggregate-free asphalt-based roofing material was obtained by contacting an asphalt-based roofing material with at least one pressurized stream of fluid to remove substantially all aggregate from the asphalt-based roofing material and drying the asphalt-based roofing material.

15. The method of claim 10, wherein the fiber product is substantially free of asphalt.

16. The method of claim 1, wherein the asphalt-based roofing material comprises roofing shingles.

17. The method of claim 1, wherein the at least one pressurized stream of fluid is directed towards an impact surface.

18. The method of claim 8, wherein the recovered aggregate is dewatered or dried to remove fluid from the aggregate.

19. The method of claim 1, further comprising the step of recovering an asphalt-fiber slurry from the separation tank.

20. The method of claim 19, wherein the asphalt-fiber slurry is dewatered or dried in a drying apparatus to remove fluid from the asphalt-fiber slurry and produce an aggregate-free asphalt-based roofing material.

21. The method of claim 20, wherein the drying apparatus is a vacuum dryer, tray dryer, fluidized bed dryer, rotary dryer, dewatering screen, spray dryer, centrifuge or a hydrocyclone.

22. The method of claim 20, wherein at least about 70 wt. % of a total weight of fluid originally present in the asphalt-fiber slurry is removed.

23. The method of claim 20, wherein the fluid removed from the asphalt-fiber slurry is recycled in the at least one pressurized stream of fluid or the separation tank.

24. The method of claim 10, wherein the aggregate-free asphalt-based roofing material is a dewatered or dried to remove moisture from the aggregate-free asphalt-based roofing material.

25. The method of claim 10, wherein steps (a) and (b) are performed at ambient temperature.

26. The method of claim 10, wherein the fiber product comprises less than about 20 wt. % of asphalt.

27. The method of claim 10, wherein the solvent comprises toluene.

\* \* \* \* \*